Patented Mar. 4, 1947

2,417,014

UNITED STATES PATENT OFFICE 2,417,014

ACIDIC SOLUTION OF A PARTIALLY POLYMERIZED MELAMINE FORMALDEHYDE CONDENSATION PRODUCT IN AN AQUEOUS ALIPHATIC POLYHYDRIC ALCOHOL SOLVENT

John D. Pollard, Stamford, Conn., assignor to American Cyanamid Company, New York, N. Y., a corporation of Maine No Drawing. Application December 30, 1943, Serial No. 516,250

14 Claims. (Cl. 260—29)

This invention relates to new compositions of matter and to their preparation and use. The novel compositions comprise a colloid solution of an aminotriazine-formaldehyde polymer in a water-soluble, polyhydroxy compound such as a polyhydric alcohol. The aforesaid compositions possess certain unique characteristics which make them useful for various applications in the arts, particularly in the treatment of hydrophilic bodies of cellulose, cellulose esters and ethers, and related compounds. The novel characteristics of my new compositions will be more fully set forth hereinafter.

In the copending application of Henry P. Wohnsiedler et al., Serial No. 453,120, filed July 21, 1942, now Patent No. 2,345,543, issued March 28, 1944, there is disclosed the preparation of colloidal dispersions of aminotriazine-aldehyde resins. These new colloidal dispersions are characterized by being aqueous solutions of partially polymerized melamine-formaldehyde condensation products having a specified degree of polymerization, wherein the particles are within the colloidal range and have a definite positive electrical charge. The colloidal, aqueous solutions usually have a pH value within the range of about 0.5 to about 3.5 when prepared at a solids content of 10 per cent. These solutions have been found to be highly useful in the treatment of paper-making fibers to form paper having a high degree of wet strength.

In my copending application, Serial No. 485,215, filed April 30, 1943, I disclosed and claimed the use of these aqueous, colloidal solutions of methylol melamine polymers in the treatment of non-fibrous, cellulosic films to render these bodies more resistant to the action of water. In accordance with that invention, cellulosic film, such as Cellophane, is passed through a dilute, colloidal solution of the acidic, methylol melamine polymer and then washed, dried, and further treated with a hydrophobic, film-forming composition. The principal purpose of the methylol melamine treatment was to provide a better bond between the hydrophilic, cellulosic body and the hydrophobic film applied thereto. As is clearly shown in my above-named application, the treatment of the cellulosic body with the particular methylol melamine solutions described results in a much stronger bond between the cellulosic body and the composition applied to it. This effect is particularly noticeable when the treated object is soaked in water.

As pointed out in the Wohnsiedler et al. application, aqueous solutions of cationically charged, colloidally dispersed, methylol melamine polymer can be obtained by aging an acidic, aqueous solution of methylol melamine at a pH within the range of about 0.5 to 3.5. When such solutions are added to a furnish of paper-making fibers and a sheet of paper is made therefrom, the resin particles appear to be adsorbed on the cellulosic fibers, and when the furnish is passed over a forming wire, the water and most of the free acid pass through the wire, leaving the resin behind firmly attached to the fibers. When used in this way, the free acid of the resin solution is disposed of and is of no great concern either in the process or in the final product. However, when these same acid, colloid solutions are used in the treatment of Cellophane as described in my above-mentioned application, the acid content of the resin solution sometimes becomes troublesome, and its removal from the treated cellulosic body must be given serious consideration.

As is generally known, cellulosic bodies, particularly those of regenerated cellulose, are very sensitive to the action of acids, and even small amounts of residual acid in the product will soon tender the cellulose and destroy its strength and value. As disclosed in my aforenamed application, the treated cellulosic body may be washed after treatment with the acid, colloid solution to remove most of the acid without seriously affecting the results of the resin treatment. This, however, is an extra processing step which adds to the cost of the finished product and, unless carefully performed, does not remove all of the acid from the cellulose.

While attempting to find some means of avoiding the necessity of using large amounts of acid in the production of methylol melamine, colloid solutions for use in the treatment of Cellophane and similar materials as described in my above-named application, I discovered that if the methylol melamine condensation product is dissolved in an acidic solution of, or containing a substantial proportion of, a water-soluble, polyhydroxy compound such as a polyhydric alcohol or an ether thereof containing at least one free hydroxyl group and one or more hydrophilic alkylene oxide groups, the amount of acid necessary to bring about the polymerization of the methylol melamine to the colloidal condition necessary to obtain the desired effects can be reduced to a very small amount. In fact, the amount of acid can be made so small that the resin solution may have a pH as high as about 6.8. This discovery constitutes the principal feature of the present invention.

As will be apparent from the foregoing, my discovery enables me to prepare colloidal solutions of methylol melamine polymers having a relatively low acid content. Another advantage of my invention is that I am able to prepare a colloidal solution, or dispersion, of a methylol melamine polymer which can be safely stored or shipped without danger of premature gelation. Still another advantage of my invention is that the resin solution is particularly adapted for use in the treatment of materials such as Cellophane, in which the presence of appreciable amounts of acid is harmful and in which the presence of a polyhydric alcohol may be desirable. Of course, my new resin solutions possess all of the advantageous characteristics of those prepared by the process in which larger quantities of acid are used.

The new methylol melamine resin solutions of the present invention are prepared by dissolving methylol melamine, or a polyhydric alcohol, soluble polymer thereof, in a suitable, water-soluble polyhydric alcohol containing a small amount of an acid. I have used both unpolymerized methylol melamine and various partially polymerized methylol melamines of commerce, including a spray-dried product, with success. The number of methylol groups per molecule of melamine in the condensation product may vary but is ordinarily of the order of about 2 to 6. The degree of polymerization of the methylol melamine starting material is relatively immaterial so long as the polymer can be dissolved in the polyhydric alcohol at a reasonable concentration, that is, from about 5 to 50 per cent or more of polymer.

Many different polyhydric alcohols may be employed as solvents for the methylol melamine. Of course, I prefer the cheaper and more readily available water-soluble, polyhydric alcohols such as glycerol and ethylene glycol. However, other polyhydric alcohols such as the polyethylene glycols, propylene glycol, polypropylene glycols, sucrose, glucose, sorbitol, mannitol, diglycerol, and the like, or mixtures thereof, may be used. I have even used compounds such as mono-ethoxydiethylene glycol with success; and while the latter compound contains but one hydroxy group, it appears to act as a polyhydric alcohol, probably because of the similarity of the alkoxy group to a hydroxy group in its solvent action on methylol melamine. Although I may use some of these alcohols as they are ordinarily sold, for example, 95 per cent glycerol, they may be diluted with, or dissolved in, water. Unfortunately, however, as the water content of the solution increases, the amount of acid required to bring about the solution of the methylol melamine and development of the polymer to its critical state also increases, so that when the solution contains less than about 30 per cent of polyhydric alcohol, the amount of acid required becomes so great that most of the advantages of the composition are lost. Accordingly, therefore, I prefer that the polyhydric alcohol solution contain at least 30 per cent by weight of polyhydric alcohol therein. Although some water appears to be necessary in the solution, the amount of water added with the acid is often insufficient. Ordinarily, at least 5 per cent of water should be present in the solution in order that the aging period may be kept within reasonable time limits.

A large number of different types and kinds of acid may be employed in the methylol melamine in polyhydric alcohol solutions to bring about the formation of the desired polymer. Of the more common acids I prefer, for most purposes, hydrochloric or acetic. However, for certain applications I sometimes prefer to use other acids. Among the acids that I have used in the production of colloidal solutions of methylol melamine polymers are chloroacetic, α-chlorpropionic, malonic, fumaric, maleic, glycolic, hydroxyisobutyric, citric, phthalic, aminoacetic, and aminobenzoic acids. Still other acids, such as phosphoric, sulfurous, formic, oxalic, and the like, may also be used.

To prepare the new methylol melamine solutions of the present invention, a quantity of methylol melamine, or a partial polymer thereof, is dissolved in an aqueous, polyhydric alcohol solution containing a small amount of an acid such as one of those just named. The proportion of acid to methylol melamine depends upon several factors including the strength of the acid, the composition of the polyhydric alcohol solution, the aging period desired, and in some cases the final application of the resin solution. As stated before, more acid is required when the amount of water in the polyhydric alcohol solution is high. For purposes of the present invention, when using a strong acid such as hydrochloric, from about 0.01 to 0.5 mol of acid for each mol of methylol melamine will be found suitable when the solution contains at least about 30 per cent of polyhydric alcohol. When using weaker acids such as acetic, it is necessary to use a larger molecular proportion of acid, for example, from about 0.02 to 1.0 mol of acid per mol of methylol melamine. Under preferred conditions the resin solution has a pH within the range of about 4.0 to 6.8. It should be understood, of course, that where the presence of larger amounts of acid are not undesirable, still larger proportions of acid may be used, and the pH of the solution may be as low as 2.0 or thereabouts.

The methylol melamine solutions may contain from about 5.0 to 50 per cent by weight of methylol melamine. As was pointed out above, the amount of methylol melamine which may be dissolved in the polyhydric alcohol solution depends upon the proportion of polyhydric alcohol in the solution and the amont of acid used. Large concentrations of methylol melamine require a high concentration of polyhydric alcohol and a large proportion of acid. For some reason, as yet unknown, the monomeric methylol melamine is more insoluble in polyhydric alcohol solutions than are the partial polymers of methlylol melamine. However, monomeric methylol melamine can be dissolved in polyhydric alcohol solutions by heating at temperatures up to 212° F. for a few minutes. Apparently, during this heating step, the monomeric methylol melamine is partially polymerized and becomes soluble in the aqueous polyhydric alcohol solution. Preferably, the solutions contain from about 10 to 20 per cent of partially polymerized methylol melamine during their aging period.

When the methylol melamine, in either monomeric or polymeric form, is first dissolved in the acidic, polyhydric alcohol solution at a concentration of from about 5 to 50 per cent methylol melamine by weight, it does not possess the necessary characteristics desired. When such solutions are used in the preparation of paper, not much improvement in the wet strength thereof is obtained, and when such solutions are used to treat Cellophane, very little improvement is found in the way in which water repellent coatings are bonded thereto. In order to develop the unique properties of the solutions of the present invention, they must be allowed to age for a period of time at a pH of less than about 6.8. During this aging period, certain physical and/or chemical changes take place, which result in the production of partially polymerized methylol melamine particles having rather definite, unique, and useful properties. I have not been able as yet to determine fully the nature of the changes which take place during the aging period. I do believe, however, that as the solutions age the methylol melamine polymerizes, and particles are formed which gradually increase in size. The growth in size of the resin particles is indicated by the formation of a bluish haze in the solution as it ages. This bluish haze is believed to be due to the gradual formation of particles of sub-microsopic size, apparently less than about 0.1 micron in diameter. I do not wish to be understood as saying, however, that the effective constituents of my new solutions are particles of this size. Since perfectly clear solutions will give equally good results, it appears that these sub-microscopic particles may be regarded as being indicative of the progress of the polymerization process, indicating that the polymerization of the methylol melamine is proceeding to such a point that an optimum particle size has been reached, and the solution is approaching the gel state. More probably, the effective particles are of the order of 0.001 to 0.02 micron in diameter.

When an acidic, polyhydric alcohol solution of a partially polymerized methylol melamine is first prepared, the solution is hydrophobic in character, and when it is diluted with water to a concentration of about 1 per cent resin solids, a flocculent precipitate of the methlol melamine is obtained. However, as the solutions age in the presence of an acid and a polyhydric alcohol, they become, at first, more hydrophilic in character and can be diluted with more and more water until the dilution can be carried down to as low as ½ per cent of methylol melamine without causing precipitation of the resin from solution. This is believed to be due to a second reaction which occurs simultaneously with the polymerization reaction. In this second reaction the methylol melamine polymer in the solution reacts with a polyhydric alcohol to produce a methylol melamine polymer having water-solubilizing hydroxy, or alkoxy, groups attached thereto. As a result, the polymer becomes more hydrophilic in character, thus permitting dilution of the solution with water to 1 per cent resin solids. However, if the solution is allowed to stand, the polymerization reaction continues, the particle size of the polymer increases, and eventually, the hydrophilic groups contributed by the polyhydric alcohol are insufficient to solubilize the polymer when diluted with water to 1 per cent resin solids. This is an important distinguishing characteristic of my resin solutions, indicating that the methylol melamine has reached such a degree of polymerization, particle size, etc., that the resin solution is ready for use in the treatment of cellulosic bodies. As the aging proceeds, the resinous particles tend to become more hydrophobic in character, and eventually the solutions sets up to form an undispersible gel.

The formation of the desired particle size of the methylol melamine particles is also indicated, in part, by precipitation of the diluted 1 per cent resin solids solution when the latter is neutralized with an alkali. Precipitation of the polymer upon neutralization of the solution also indicates that the acid in the solution also has an important solubilizing action. It is not necessary, however, that the resin solution be aged until the 1 per cent dilution is precipitated upon neutralization, since under certain conditions a hydrophilic, water-soluble polymer of the desired particle size is obtained.

Another characteristic of my new solutions is the observed fact that the predominating proportion of methylol melamine particles are positively charged. This is evidenced by their migration toward the cathode when the solution is placed in an electrophoresis cell and a direct current applied. As known, cellulosic fibers have a negative charge and, in view of the fact that my resin solutions are particularly useful in the treatment of cellulosic fibers, it is possible that there is an important relationship between the positive charge on the methylol melamine particles and the negative charge on the cellulosic fiber, wherein the charged resin particles are attracted to and adsorbed on the oppositely charged cellulosic body.

The length of time required to age my methylol melamine-polyhydric alcohol solutions to the desired particle size, etc., also depends upon a number of factors, including concentration of the polyhydric alcohol solution, the resin solids content, the initial degree of polymerization of the methylol melamine, the temperature at which the solution is aged, and the strength and concentration of the acid in the solution. In general, all other factors being constant, the lower the percentage of polyhydric alcohol in the solution, the shorter the time required for aging. For example, when 12 per cent of a partially polymerized methylol melamine is dissolved in a 60 per cent glycerol or ethylene glycol solution containing 0.1 mol of acetic acid per mol of melamine, the methylol melamine solution goes through a complete cycle from hydrophobe to water-dilutable hydrophile to an undispersible gel in from 6 to 10 days when it is maintained at room temperature. Under usual conditions the methylol melamine solution can be diluted to a 1 per cent resin solids content after aging for about 24 hours and can be used any time thereafter until the resin has become hydrophobic and sets up to a gel. During this aging period the solution reaches an optimum efficiency, after which it falls off in effectiveness. This optimum aging period varies with the use for which the resin solution is to be employed. Control tests such as those shown in the specific examples may be used to determine the optimum aging period for each resin solution.

When the methylol melamine solutions contain a high percentage of polyhydric alcohol, for example, 80 per cent or more, the polymerization is extremely slow at room temperature, and several months are required for completion of the hydrophobe-hydrophile-gel cycle. However, the solutions may be heated and the aging period thus reduced very materially. This behavior of the methylol melamine solutions may be used to good advantage in the preparation of aged methylol melamine solutions which can be stored and shipped. Stable solutions of this kind may be prepared by making a solution with appropriate amounts of methylol melamine, polyhydric alcohol, and acid, and heating it to about 80° C. until the desired solution characteristics have been reached. The heating is then stopped. If the concentration of the polyhydric alcohol is high enough, the solution will remain in the hydrophilic condition for a long period of time and may be safely stored and shipped without further dilution.

The slowness with which the methylol melamine solutions age in concentrated solutions of polyhydric alcohol may be taken advantage of in still another way. For example, a solution containing about 60 per cent aqueous glycerol, 25 per cent methylol melamine, and 0.1 mol of acetic acid can be prepared and aged at room temperature for two or three days until the optimum colloidal condition of the resin has been reached. Then, the resin solution may be diluted with 95 per cent glycerol to yield a solution having about 10-12 per cent of aged methylol melamine polymer and containing about 80 per cent of glycerol. This solution may be stored at room temperature, or lower, for months without appreciable change or damage to the colloidal resin contained therein.

From the foregoing it will be seen that the aging period may be decreased by the presence of a larger amount of water in the solution, by an increased temperature, by an increase in the resin solids content, and by an increase in the concentration of the acid or by the use of a stronger acid. The converse of this is also true. From these facts it is apparent that the aging time may vary over a wide range extending from a period of about 10 to 15 minutes up to a period of 50 to 60 days. For obvious reasons I prefer to regulate the various factors involved so that the aging period may take place within a period of from about 1 hour to 5 days.

The methylol melamine-polyhydric alcohol solutions just described may be used for a wide variety of purposes for treating hydrophilic materials, particularly those of a cellulosic nature. Typical materials of this type include paper-making fibers, textile fibers of cotton, rayon, linen, hemp, jute, etc., and other cellulosic fibers having free hydrophilic hydroxy groups such as in the case of incompletely esterified cellulose esters and in cellulose ethers. The resin solutions of the present invention are useful in the treatment of such fibers in the production of paper of high wet strength and in the treatment of cellulosic fabrics to improve their ability to cling to surface coatings, water-proofing agents, adhesives, and the like. The solutions are also useful in the treatment of rayon cord such as is used in the production of automobile tires and the like to improve the bond between the cord and latex or rubber. The solutions are also useful in the treatment of Cellophane and similar hydrophilic bodies to improve their dimensional stability and to improve the manner in which they are bonded to water-repellent coatings, printing inks, and adhesives. Other uses of these novel resin solutions will occur to those skilled in the art.

My invention will now be illustrated in greater particularity by means of the following examples in which various resin solutions are prepared and aged to illustrate some of the factors involved in their preparation. Other examples show some of the principal uses of my new resin solutions and the advantages of the treatment. In these examples the same slightly polymerized methylol melamine was used throughout. It should be understood that these examples are given primarily to illustrate the invention and are not to be construed as limiting it to the particular details shown. All parts are by weight unless otherwise indicated.

EXAMPLE 1

To 100 g. of aqueous glycerol solution, prepared by dissolving three parts by weight of 95% glycerol in two parts by weight of water, was added 0.60 g. (0.01 mol) of glacial acetic acid. The acidified solution was heated to 140° F., and 25 g. (approximately 0.1 mol) of methylol melamine was added, with stirring. Upon substantial solution of the methylol melamine the mixture was diluted to 200 g. with aqueous glycerol solution of the same composition as that used for the initial solution. The solution was then allowed to age at room temperature. From time to time samples of the solution were removed and diluted with water to approximately 1% resin solids. This experiment was repeated using glycerol solutions containing varying percentages of glycerol.

In the case of those solutions containing 40%, and less, of glycerol, it was not possible to disperse the methylol melamine at 12% solids with the amount of acid employed. When the glycerol solution contained more than 40% glycerol, it was possible to disperse 12% of methylol melamine therein; but when freshly prepared, the solutions precipitated the resin when diluted with water to 1% resin solids. Upon aging, however, it became possible to dilute the solutions to 1% resin solids to obtain either a water-clear solution or a slightly hazy, stable, colloidal dispersion of the resin. The results of this series of experiments are shown in the following table. The abbreviation "ppt." means that a precipitate was formed upon dilution of the 12% solution to 1% resin solids; the abbreviation "col." means that a slightly hazy, but stable, colloidal solution was obtained; the abbreviation "clr." means that the solution was perfectly clear; and "gel" indicates that the 12% solution had gelled.

TABLE I

12% methylol melamine glycerol-water solution

[0.1 mol acetic acid per mol methylol melamine]

| Glycerol | pH | Appearance of 1% dilution after aging | | | | |
|---|---|---|---|---|---|---|
| | | 1 hr. | 1 day | 5 days | 10 days | 16 days |
| 0% (100% water) | | Not dispersible as 12% solids solution. | | | | |
| 20% | | Not dispersible as 12% solids solution. | | | | |
| 40% | | Not dispersible as 12% solids solution. | | | | |
| 60% | 5.3 | Ppt | Col | Col | Gel | |
| 80% | 5.1 | Ppt | Col¹ | Clr | Clr | Clr. |
| 95% | 5.1 | Ppt | Col.¹ | Clr | Clr | Clr. |
| 60% (no acid used) | | Ppt | Ppt | Ppt | Ppt | Ppt. |
| 80% (no acid used) | 7.2 | Ppt | Ppt | Ppt | Ppt | Ppt. |
| 90% (no acid used) | 7.2 | Ppt | Ppt | Ppt | Ppt | Ppt. |

¹ Unstable.

It will be understood, of course, that when a larger molecular proportion of acid is used, or when the acid is a stronger one, it is possible to prepare solutions with lower percentages of glycerol, which age to form solutions which may be diluted to 1% resin solids solution without precipitation. The above table also shows that when no acid is used, it is not possible to obtain methylol melamine solutions which may be diluted to 1% resin solids without precipitation even after an extended aging period.

EXAMPLE 2

A similar series of experiments was run, differing from the above only in that ethylene glycol was used in place of glycerol as the polyhydric alcohol. The results of these experiments are shown in the following table.

TABLE II

12% methylol melamine ethylene glycol-water solution

[0.1 mol acetic acid per mol methylol melamine]

| Ethylene glycol | pH | Appearance of 1% dilution after aging | | | | |
|---|---|---|---|---|---|---|
| | | 1 hr. | 1 day | 5 days | 10 days | 16 days |
| 0% (100% water) | | Not dispersible as 12% solids solution. | | | | |
| 20% | | Not dispersible as 12% solids solution. | | | | |
| 40% | | Not dispersible as 12% solids solution. | | | | |
| 60% | 5.1 | Ppt | Col. | Col. | Gel. | |
| 80% | 5.2 | Ppt | Ppt | Clr. | Clr. | Clr. |
| 100% | 5.4 | Ppt | Ppt | Clr. | Clr. | Clr. |

As will be seen from the above, similar results are obtained when using ethylene glycol as the polyhydric alcohol.

EXAMPLE 3

Another series of experiments, similar to those of Example 1, was made. In this series hydrochloric acid was used in place of acetic acid, but the amount was reduced, so that it was present in the solution in amounts corresponding to 0.05 mol of hydrochloric acid per mol of methylol melamine. The results of this series of tests are shown in the following table.

TABLE III

12% methylol melamine glycerol-water solution

[0.05 mol HCl per mol methylol melamine]

| Glycerol | pH | Appearance of 1% dilution after aging | | | | |
|---|---|---|---|---|---|---|
| | | 1 hr. | 1 day | 5 days | 10 days | 16 days |
| 0% (100% water) | | Not dispersible as 12% solids solution. | | | | |
| 20% | | Not dispersible as 12% solids solution. | | | | |
| 40% | | Not dispersible as 12% solids solution. | | | | |
| 60% | 5.5 | Ppt | Ppt | Col. | Col. | Gel. |
| 80% | 5.4 | Ppt | Col.[1] | Col.[1] | Clr. | Clr. |
| 95% | 5.4 | Ppt | Col.[1] | Clr. | Clr. | Clr. |

[1] Unstable.

EXAMPLE 4

To 100 g. of aqueous sucrose solution, prepared by dissolving three parts by weight of sucrose in two parts by weight of water, was added 0.60 g. of glacial acetic acid. The acidified sucrose solution was heated to 140° F., and then 25 g. of methylol melamine was stirred in. After substantial solution of the solid methylol melamine, the solution was diluted to 200 g. with aqueous sucrose solution of the same composition as that originally used to dissolve the methylol melamine. The pH of the final, freshly prepared solution was 4.8. As freshly prepared, the solution could not be diluted with water to a 1% resin solids content to provide a clear 1% resin solids solution. However, after standing for 24 hours at room temperature, the solution could be diluted with water to a 1% methylol melamine solids concentration to produce a substantially clear solution. After aging for about 10 days, the 12% resin solution gelled.

EXAMPLE 5

A methylol melamine solution was prepared exactly as described in the preceding example except that the solvent employed was prepared by mixing three parts by weight of diglycerol with two parts by weight of water. The pH of the resulting solution was 5.2. When freshly prepared, the solution could not be diluted with water to a 1% resin solids concentration. However, after aging for two days, the 12% resin solids solution could be diluted with water to a 1% solids content to obtain a clear solution. When aged at room temperature for six days, a 1% dilution of the 12% resin solution was characterized by a distinct bluish opalescence indicative of a colloidal dispersion of the methylol melamine polymer. After about ten days' aging at room temperature, the 12% solution gelled.

EXAMPLE 6

A methylol melamine solution was prepared exactly as described in Example 4 except that the solvent employed was prepared by mixing three parts by weight of mono-ethoxydiethylene glycol and two parts by weight of water. The original solution of methylol melamine thus obtained had a pH of 5.3. When first prepared, the methylol melamine precipitated when the 12% solution was diluted with water to a 1% solids content. However, after aging for three days, the 12% solution could be diluted to 1% solids content to yield a colloidal dispersion of methylol melamine polymer.

EXAMPLE 7

A melamine formaldehyde-urea formaldehyde copolymer, prepared by heating together 0.7 gram mol of melamine, 0.3 gram mol of urea, and 4.0 gram mols of aqueous 37% formaldehyde, was dissolved in a solution containing 60% of glycerol and 40% of water to provide a solution containing 12% by weight of copolymer solids. When this solution was diluted with water to a resin solids content of 1%, a flocculent precipitate of the copolymer was thrown down. However, when 0.07 mol of acetic acid per mol of copolymer was added to the 12% resin solution, the solution, after aging for 24 hours, could be diluted with water to 1% resin solids content to obtain a clear solution.

The above experiment was repeated using a 40% glycerol solution. As before, the 12% solution containing no acid produced a flocculent precipitate of the copolymer when diluted to 1% resin solids content. On the other hand, the copolymer containing 0.07 mol of acetic acid gave a clear solution after aging for 24 hours when diluted to a 1% resin solids content.

A solution of methylol melamine-methylol urea copolymer containing 12% resin solids was made up in 20% aqueous glycerol with 0.2 mol of acetic acid per mol of copolymer. After aging this solution for 24 hours at room temperature, it could be diluted with water to 1% resin solids to produce a pale blue, colloidal dispersion of the copolymer.

EXAMPLE 8

To demonstrate the utility of my new methylol melamine-polyhydric alcohol solutions in the treatment of Cellophane to bond water-proof coatings thereto, a 12% methylol melamine solution in 60% aqueous glycerol with 0.1 mol of acetic acid was prepared as described in Example 1. After this solution had aged for four hours, it was diluted with water to 1% resin content. Sheets of untreated, reswollen Cellophane were then impregnated with the 1% resin solution, removed from the resin solution, washed with water, immersed in an 8% glycerol solution, and then dried. The Cellophane film contained 0.76% by weight, dry basis, of methylol melamine resin.

The resin-treated cellulosic film was then coated with a film-forming coating composition comprising 18 parts by weight of nitrocellulose, 11.7 parts of dibutyl phthalate, 1.0 part paraffin wax, 2.3 parts of damar resin, and sufficient solvent to make the composition suitable for application. The coated cellulosic sheets were then dried in a circulating hot air oven at 85–90° C. and then trimmed to approximately 3" x 4". The films were then immersed in water at room temperature and examined periodically to determine the effectiveness of the bond between the water-repellent film and the treated cellulosic base sheet. It was found that after 8 days' immersion in water, the water-repellent coating was still firmly bonded to its base sheet. A control sheet which had not been impregnated with the methylol melamine solution but which had been treated with glycerol and coated with the same coating composition and dried was found to separate from the water-repellent coating within a few hours after immersion in water.

The above experiment was repeated with the omission of the step of washing the cellulosic sheet after treatment with the 1% resin solution. The dried sheet contained 4.40% resin, dry basis, and was also found to be firmly bonded to the water-repellent coating even after 8 days' immersion in water.

Another acidic resin solution was prepared as described in Example 1 using 80% aqueous glycerol. After aging the solution for four hours at 12% resin solids, the solution was diluted with water to 1% resin solids as above. Cellulose films were then impregnated with the resin solution, washed, immersed in 8% glycerol, and dried as before. A water-repellent nitrocellulose coating was applied to the resin-treated cellulose film and dried. After immersion in water for 8 days the water-repellent coating was strongly bonded to its base sheet.

Many other tests were made in a similar manner with various resin solutions prepared from different polyhydric alcohols, and whenever a resin solution was prepared in accordance with the process hereinbefore described, it was found to be effective in bonding water-proof coatings to Cellophane. Different methylol melamine products in varying degrees of initial polymerization and several kinds of melamine-urea-aldehyde copolymers were also tested under varying conditions and were found to be effective in bonding waterproof coatings to Cellophane when dissolved in an acidic solution of a polyhydric alcohol and allowed to age as described herein.

EXAMPLE 9

To demonstrate the effectiveness of my new resin solutions in increasing the wet strength of paper, a series of tests was made. A stock suspension of beaten 100% bleached kraft fibers was first prepared. A quantity of each of the methylol melamine-polyhydric alcohol aged solutions described in Examples 1 to 7 was added to separate portions of the fiber suspensions in amounts such that the fiber suspension contained 3% by weight of resin based on the dry weight of the pulp contained therein. Hand sheets were then prepared from the treated stock, and the sheets were dried and heat cured. The finished sheets were found to have a very greatly increased wet strength over that of the control sheets containing none of the aged resin solution. The wet rub and the folding endurance of the paper were also materially increased. In some cases the wet tensile strength was increased 6 to 8 times over that of the control. The percentage of resin retained in the sheet varied with the efficiency of the aged resin solution but was as high as 2.34%, indicating a retention better than 75% of the resin added to the slush stock.

EXAMPLE 10

Swatches of unsized, viscose rayon fabric were treated with the aged methylol melamine-polyhydric alcohol solutions prepared as described in Examples 1, 2, 4, 5, and 7, which had been diluted with water to 1% resin content. The resin solutions had been aged for varying periods of from 1 day to 8 days. Some of the swatches of treated fabric were washed with water and then dried, and others were dried without washing. As a result, the treated swatches contained varying amounts of from about 0.11% to 2.0% by weight of resin. The treated swatches were then coated with a pigmented polyvinylbutyral coating of a commercial type. Subsequently, tests were made to determine the adhesion of the coating composition to the rayon fabric. It was found that in all cases the polyvinyl butyral coating was more strongly bonded to the resin-treated rayon fabric than to the control swatches which had not had a pre-treatment with the aged resin.

A similar series of tests, in which swatches of a cotton percale fabric were given a pre-treatment with aged methylol melamine-polyhydric alcohol solutions, also showed that the resin treatment was highly effective in increasing the bond between the cotton fabric and the subsequently applied polyvinyl butyral coating. In all cases treatment with the aged solution resulted in better adhesion of the coating to the fabric than was found possible by pre-treatment with an unaged, organic solvent solution of methylol melamine polymer.

I claim:

1. An acidic solution of a partially polymerized melamine-formaldehyde condensation product in a solvent comprising at least 5% by weight of water and at least 30% by weight of a water-soluble aliphatic polyhydroxy alcohol, said solution containing 5 to 50% by weight of a melamine-formaldehyde polymer in a degree of polymerization less than that of an undispersible gel and being dilutable with water to a 1% melamine-formaldehyde polymer solids content without precipitation thereof.

2. An acidic solution of a partially polymerized melamine-formaldehyde condensation product in a solvent comprising an aqueous, aliphatic polyhydric alcohol solution containing at least 5% by weight of water and at least 30% by weight of a water-soluble aliphatic polyhydric alcohol, said solution having a pH of 4.0 to 6.8 and containing 5 to 50% by weight of a melamine-formaldehyde polymer in a degree of polymerization less than that of an undispersible gel and being dilutable with water to a 1% melamine-formaldehyde polymer solids content without precipitation thereof.

3. An acidic solution of a partially polymerized melamine-formaldehyde condensation product in a solvent comprising an aqueous, aliphatic polyhydric alcohol solution containing at least 5% by weight of water and at least 30% by weight of a water-soluble aliphatic polyhydric alcohol, said solution containing 5–50% by weight of melamine-formaldehyde polymer in a degree of polymerization less than that of an undispersible gel and being dilutable with water to a 1% melamine-formaldehyde polymer solids content without precipitation thereof.

4. An acidic solution of a partially polymerized melamine-formaldehyde condensation product in a solvent comprising an aqueous aliphatic polyhydric alcohol solution containing at least 5% by weight of water and at least 30% by weight of a water-soluble aliphatic polyhydric alcohol, said solution having a pH of from 4.0 to 6.8 and containing 5 to 50% by weight of melamine-formaldehyde polymer in a degree of polymerization advanced to such a state that the polymer is precipitated from solution when the acidic solution thereof is neutralzed and being dilutable with water to a 1% melamine-formaldehyde polymer solids content without precipitation thereof.

5. An acidic solution of a partially polymerized melamine-formaldehyde condensation product in a solvent comprising an aqueous glycerol solution containing at least 5% by weight of water and at least 30% by weight of glycerol, said solution having a pH of from 4.0 to 6.8 and containing 5 to 50% by weight of partially polymerized, cationically charged methylol melamine polymer particles having a diameter of not more than 0.1 micron, said polymer being in a degree of polymerization such that the particles thereof are precipitated from solution when the acidic solution is neutralized, and said solution being dilutable with water to a 1% methylol melamine polymer solids content without precipitation thereof.

6. An acidic solution of a partially polymerized melamine-formaldehyde condensation product in a solvent comprising an aqueous glycerol solution containing at least 5% by weight of water and at least 30% by weight of glycerol, said solution having a pH of from 4.0 to 6.8 and containing 5-50% by weight of cationically charged methylol melamine polymer particles in a degree of polymerization less than that of an undispersible gel and being dilutable with water to a 1% methylol melamine polymer solids content without precipitation thereof.

7. An acidic solution of a partially polymerized melamine-formaldehyde condensation product in a solvent comprising an aqueous ethylene glycol solution containing at least 5% by weight of water and at least 30% by weight of ethylene glycol, said solution having a pH of from 4.0 to 6.8 and containing 5-50% by weight of cationically charged methylol melamine polymer particles in a degree of polymerization less than that of an undispersible gel and being dilutable with water to a 1% methylol melamine polymer solids content without precipitation thereof.

8. An acidic solution of a partially polymerized melamine-formaldehyde condensation product in a solvent comprising an aqueous polyethylene glycol solution containing at least 5% by weight of water and at least 30% by weight of polyethylene glycol, said solution having a pH of from 4.0 to 6.8 and containing 5–50% by weight of cationically charged methylol melamine polymer particles in a degree of polymerization less than that of an undispersible gel and being dilutable with water to a 1% methylol melamine polymer solids content without precipitation thereof.

9. A method of preparing a solution of partially polymerized melamine-formaldehyde condensation product which comprises the steps of dissolving 5 to 50% by weight of a melamine-formaldehyde condensation product in an acidic solution of a solvent comprising at least 5% by weight of water and at least 30% by weight of glycerol and allowing the solution to stand at a pH of from 4.0 to 6.8 until the melamine-formaldehyde condensation product has polymerized to a degree of polymerization less than that of an undispersible gel but being dilutable with water to a 1% melamine-formaldehyde polymer solids content without precipitation thereof.

10. A method of preparing a solution of a melamine-formaldehyde condensation product which comprises dissolving from 5 to 50% by weight of a melamine-formaldehyde condensation product in a solvent comprising at least 5% by weight of water and at least 30% by weight of an aliphatic polyhydric alcohol, said solvent containing from 0.01 to 1.0 mol of an acid for each mol of said condensation product dissolved therein, and allowing said solution to age until the melamine-formaldehyde polymer has reached a degree of polymerization less than that of an undispersible gel and being dilutable with water to a 1% melamine-formaldehyde polymer solids content without precipitation thereof.

11. A method of preparing a solution of a melamine-formaldehyde condensation product which comprises dissolving from 5 to 50% by weight of a melamine-formaldehyde condensation product in a solvent comprising at least 5% by weight of water and at least 30% by weight of glycerol, said solvent containing from 0.01 to 1.0 mol of an acid for each mol of said condensation product dissolved therein, and allowing said solution to age until the melamine-formaldehyde polymer has reached a degree of polymerization less than that of an undispersible gel and being dilutable with water to a 1% melamine-formaldehyde polymer solids content without precipitation thereof.

12. A method of preparing a solution of a melamine-formaldehyde condensation product which comprises dissolving from 5 to 50% by weight of a melamine-formaldehyde condensation product in a solvent comprising at least 5% by weight of water and at least 30% by weight of ethylene glycol, said solvent containing from 0.01 to 1.0 mol of an acid for each mol of said condensation product dissolved therein, and allowing said solution to age until the melamine-formaldehyde polymer has reached a degree of polymerization less than that of an undispersible gel and being dilutable with water to a 1% melamine-formaldehyde polymer solids content without precipitation thereof.

13. A method of preparing a solution of a melamine-formaldehyde condensation product which comprises dissolving from 5 to 50% by weight of a melamine-formaldehyde condensation product in a solvent comprising at least 5% by weight of water and at least 30% by weight of polyethylene glycol, said solvent containing from 0.01 to 1.0 mol of an acid for each mol of said condensation product dissolved therein, and allowing said solution to age until the melamine-formaldehyde polymer has reached a degree of polymerization less than that of an undispersible gel and being dilutable with water to a 1% melamine-formaldehyde polymer solids content without precipitation thereof.

14. A method of preparing a solution of a partially polymerized melamine-formaldehyde condensation product, said solution being particularly useful in the treatment of hydrophilic, cellulosic bodies, which comprises dissolving 5–50% by weight of a melamine-formaldehyde condensation product in a solvent having a pH within the range of 4.0 to 6.8 comprising an aqueous solution containing at least 5% by weight of water and at least 30% by weight of an aliphatic polyhydric alcohol and allowing the solution to age until the melamine-formaldehyde polymer therein has reached a degree of polymerization such that it is precipitated from solution when the acidic solution is neutralized and such that the solution may be diluted with water to a 1% melamine-formaldehyde polymer solids content without precipitation thereof.

JOHN D. POLLARD.

REFERENCES CITED

The following references are of record in the file of this patent:

UNITED STATES PATENTS

| Number | Name | Date |
|---|---|---|
| 2,197,357 | Widmer et al. | Apr. 16, 1940 |
| 2,345,543 | Wohnsiedler et al. | Mar. 29, 1944 |